United States Patent
Koch et al.

(10) Patent No.: US 8,428,790 B2
(45) Date of Patent: *Apr. 23, 2013

(54) SYSTEMS AND METHODS FOR MACHINE CONTROL IN DESIGNATED AREAS

(75) Inventors: Roger Dale Koch, Pekin, IL (US); James Decker Humphrey, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/645,459

(22) Filed: Dec. 22, 2009

(65) Prior Publication Data

US 2011/0153117 A1    Jun. 23, 2011

(51) Int. Cl.
*G01M 15/00*    (2006.01)

(52) U.S. Cl.
USPC .............................................................. 701/2

(58) Field of Classification Search ............. 701/2, 300, 701/301, 302, 116, 117; 340/988, 989
See application file for complete search history.

(56) References Cited

U.S. PATENT DOCUMENTS

| | | | |
|---|---|---|---|
| 5,477,459 A * | 12/1995 | Clegg et al. | 701/300 |
| 5,629,855 A | 5/1997 | Kyrtsos et al. | |
| 5,987,379 A | 11/1999 | Smith | |
| 6,134,493 A | 10/2000 | Kaneko | |
| 6,799,100 B2 | 9/2004 | Burns et al. | |
| 7,162,347 B2 | 1/2007 | Shibamori et al. | |
| 7,251,548 B2 | 7/2007 | Herz et al. | |
| 2006/0272536 A1 * | 12/2006 | Lownds et al. | 102/215 |
| 2009/0096637 A1 * | 4/2009 | Olson et al. | 340/993 |
| 2011/0153541 A1 * | 6/2011 | Koch et al. | 706/52 |

OTHER PUBLICATIONS

Koch et al.; U.S. Appl. No. 12/645,462, entitled Systems and Methods for Machine Control in Designated Areas, filed concurrently on Dec. 22, 2009 (40 pages).

* cited by examiner

*Primary Examiner* — Faye M. Fleming
(74) *Attorney, Agent, or Firm* — Finnegan, Henderson, Farabow, Garrett & Dunner LLP

(57) ABSTRACT

Systems and methods for controlling a machine comprise receiving information indicative of an occurrence of a prospective event and providing an event initiation signal to one or more machines. The event initiation signal may be configured to cause a controller of the one or more machines to control movement of the one or more machines based at least on a location of the machine relative to a designated area surrounding a location at which the prospective event is to occur.

21 Claims, 5 Drawing Sheets

SYSTEMS AND METHODS FOR MACHINE CONTROL IN DESIGNATED AREAS

TECHNICAL FIELD

The present disclosure relates generally to automated machine control and, more particularly, to systems and method for defining machine behavior in certain designated areas.

BACKGROUND

Many commercial and industrial job-sites require the use and/or cooperation of heavy machines, each of which may be designed to perform a particular specialized task. In order to effectively manage equipment resources of such a job-site, a daily project schedule may be developed by a project manager or job-site foreman and distributed to equipment operators and other job-site personnel. The project schedule may contain task and resource schedules for individual machines or groups of machines, as well as other job-site related information, such as equipment or resource outages, unexpected outage contingency plans, and scheduled job-site shut-downs. As the job-site operations progress throughout the day, human or automated dispatchers may provide status updates, announce changes to equipment and resource schedules, and provide other instructions for managing the real-time operation of the job-site.

Some commercial and industrial job-sites require continuous or periodic interruption of certain job-site resources during the course of completing one or more job-site tasks. For example, in a surface or subsurface mine site, a road or path that is used to haul excavated ore from the mine to a designated sub location may become temporarily obstructed (e.g., by debris, a stalled machine, etc.). Consequently, the haul road (and associated ingress and egress paths and surrounding areas) may be temporarily shut-down by the job-site manager, and future traffic may be re-routed to an alternative path during the shut-down period. The dispatcher may provide instructions notifying the machine operators and other job-site personnel of the shut-down, the location and route of the alternative path, and other related information to maintain operation of the mine site.

Although conventional dispatch systems may be effective for handling large-scale communication of information across the job-site in certain situations, they provide little or no specific information regarding the operation of individual machines or machine operators in response to such information. Further, such conventional dispatch systems, while serving an informative function, provide insufficient mechanisms for enforcing instructions that are broadcast throughout the job-site.

One system for defining specialized instructions for individual machines in certain designated "buffer zones" and providing notifications of operational violations of individual machines in these buffer zones is described in U.S. Pat. No. 5,987,379 to Smith ("the '379 patent"). The '379 patent discloses a system for defining a "buffer zone" around a restricted area or hazardous activity at a construction or mine site. The "buffer zone" may be stationary or variable depending upon the nature of the activity, the potential for change of the activity over time, or the potential for change in the region over time. The '379 patent also discloses that the system permits assignment of priority indices and/or hazard indices to activities. Based on the priority and/or hazard indices, the '379 patent notifies entities that are designated to perform higher priority activities that they are authorized to continue operations within an activated buffer zone (while also notifying them of possible constraints on the scope of such authorized activities). The system of the '379 patent also notifies entities that are designated to perform lower priority activities that they are not authorized to continue operations within an activated buffer zone. If the entities that are designated to perform lower priority activities continue to operate in the activated buffer zone, the system of the '379 patent provides a signal to the entity and/or a central control station that a buffer zone violation has occurred, and that the entity should be moved.

Although the '379 patent allows for the creation and modification of "buffer zones" for defining a hierarchy of approved operations in such buffer zones and provides a notification system that informs machine operators and job-site manager(s) of deviations from the operational hierarchy, it does not adequately manage the operations of individual machines or groups of machines in the buffer zones. For example, the recourse disclosed in the '379 patent for dealing with machines that disobey buffer zone instructions and/or restrictions is limited to the provision of "an alarm signal" to the machine operator (or job-site manager) and/or the dispatching of a person of authority to forcibly move the machine out of the buffer zone. However, the '379 patent does not provide for the control of machines operating in and around the designated buffer zone. As a result, the buffer zone creation and monitoring system disclosed the '379 patent is limited in its ability to control individual machines and, therefore, limited in its ability to manage the overall operations of the job-site.

Furthermore, although the '379 patent discloses the establishment of buffer zones for both scheduled and unscheduled activities in certain situations, it may cause inefficiencies within a job-site. For example, the disclosure of the '379 patent does not provide for the modification or temporary postponement of such activities based on real-time (or near real-time) operations of the job-site. More particularly, the system of the '379 patent does not schedule or modify activities that require the establishment of a buffer zone based on current or prospective operations of machines and resources of the job-site. Because the system of the '379 patent does not manage the schedule of non-emergency activities based on actual operating conditions of the job-site, the system may unnecessarily restrict access to a zone during a time of peak activity in the zone. Thus, the system and method described in the '379 patent may unnecessarily limit the efficiency of the job-site.

The presently disclosed systems and methods for machine control in designated areas are directed toward overcoming one or more of the problems set forth above and/or the problems in the art.

SUMMARY

In accordance with one aspect, the present disclosure is directed to a method for controlling a machine. The method comprises receiving information indicative of an occurrence of a prospective event. An event initiation signal may be provided to one or more machines. The event initiation signal may be configured to cause a controller of the one or more machines to control movement of the one or more machines based at least on a location of the machine relative to a designated area surrounding a location at which the prospective event is to occur.

According to another aspect, the present disclosure is directed to a method for controlling a machine. The method comprises receiving, at a processor associated with a job-site management system, information indicative of an occurrence of a prospective event and identifying, at the processor, a designated area surrounding a location at which the perspective event is to occur. The method may also include identifying, at the processor, one or more machines operating within the designated area. An event initiation signal may be provided by the processor to the one or more identified machines. The event initiation signal may be configured to initiate an event control sequence for each of the one or more identified machines. The event control sequence may be configured to control movement of the one or more identified machines based at least on a location of the machine relative to the designated area.

In accordance with yet another embodiment, the present disclosure is directed to a system for controlling a machine that is located near a blast zone in a mine environment. The system may comprise a communication interface for receiving information indicative of an occurrence of a detonation of explosive material in a mine site. The system may also comprise a processor coupled to the communication interface and configured to identify a blast zone surrounding a location at which the detonation is to occur. The processor may also be configured to identify one or more machines operating within the blast zone and provide an event initiation signal to the one or more identified machines. The event initiation signal may be configured to initiate an event control sequence for each of the one or more machines. The event control sequence may be configured to control movement of the one or more machines based at least on a location of the machine relative to the blast zone.

DETAILED DESCRIPTION

Figure 1:
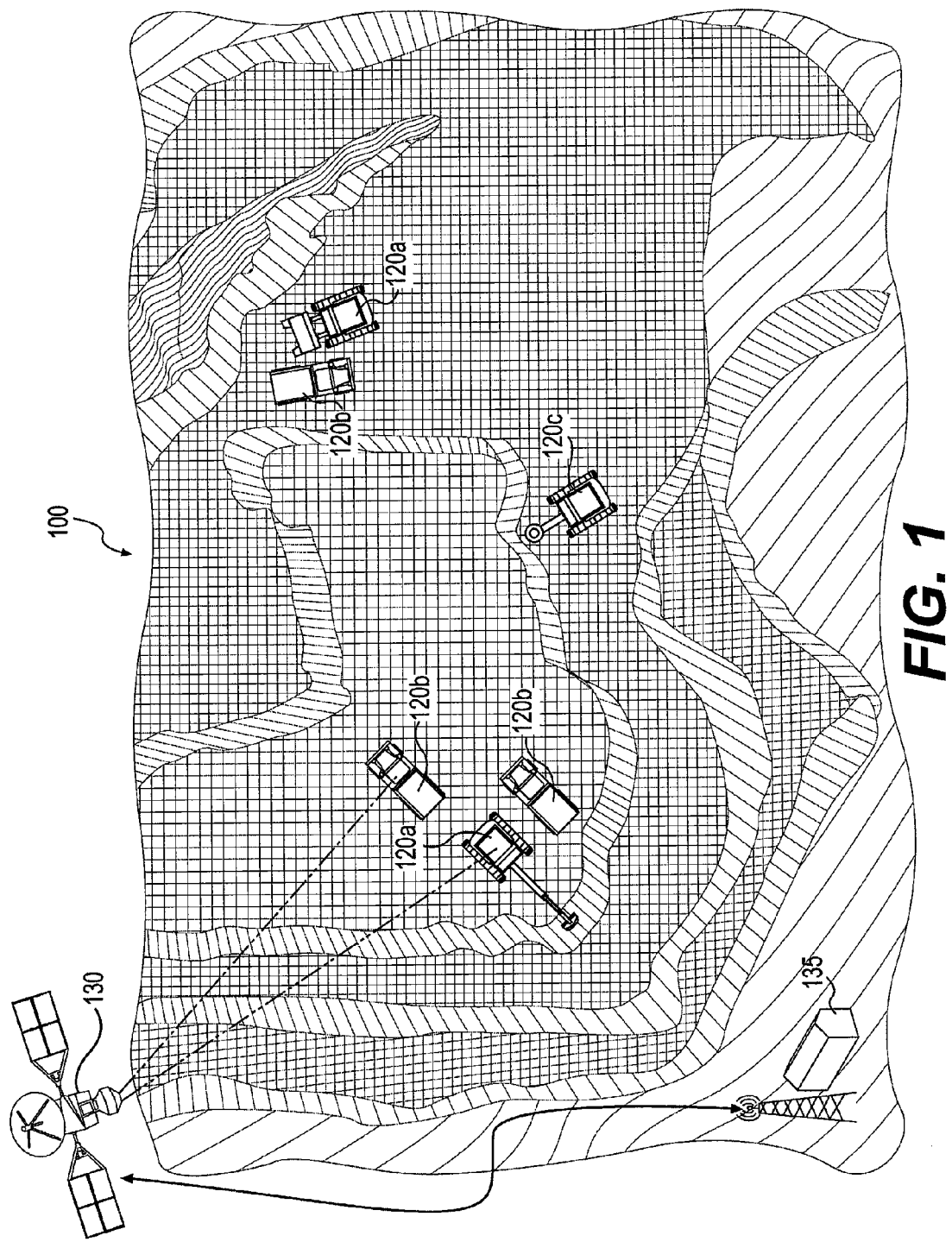
FIG. 1 provides an overhead illustration of an exemplary job-site consistent with the disclosed embodiments.

FIG. 1 illustrates an exemplary job-site 100, in which systems and methods for controlling a machine that is located in a designated area may be implemented consistent with the disclosed embodiments. Job-site 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, job-site 100 may include a mine environment that comprises one or more machines 120a-120c communicatively coupled to a job-site management system 135 via a communication network 130 (such as, for example, a satellite communication link, as illustrated in the exemplary embodiment of FIG. 1). Components and system associated with job-site 100 may be configured to monitor, collect, and filter information associated with the status and/or performance of one or more machines 120a-120c, and distribute the information to one or more back-end systems or entities, such as job-site management system 135. It is contemplated that additional and/or different components than those listed above may be included in job-site 100.

As illustrated in FIG. 1, machines 120a-120c may include one or more excavators 120a, transport machines 120b, and/or drills 120c. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, track-type tractors, dozers, wheel loaders, etc. Transport machines 120b may embody any machine that is configured to transport materials within job-site 100 such as, for example, articulated trucks, dump trucks, trains, or any other truck adapted to transport materials. Drills 120c may embody any machine that is configured to bore subsurface holes in the surface of a job-site to loosen or remove subsurface material for excavation and/or to create a subsurface void in which explosive materials may be placed for surface or subsurface detonation of explosive material. The number, size, and type of machines illustrated in FIG. 1 are exemplary only and not intended to be limiting. Accordingly, it is contemplated that job-site 100 may include additional, fewer, and/or different components than those listed above. For example, job-site 100 may include a skid-steer loader, a track-type tractor, material transfer vehicle, water truck, emergency vehicle, draglines, bucket wheel excavators, crushers, conveyors, or any other suitable fixed or mobile machine that may contribute to the operation of job-site 100.

Machines 120a-120c may include manually-operated machines, autonomous machines, a combination of manually-operated and autonomous machines, or machines that may be operated in both manually-operated or autonomous mode. Manually-operated machines, as the term is used herein, refers to machines that are capable of being operated by a human or robotic operator that is located in an operator station of the machine. Alternatively or additionally, a manually-operated machine may include an on-board electronic control system that is adapted for operation by a remote control device by an external (off-board) equipment operator, such as an off-board human operator.

Autonomous machines, as the term is used herein, refers to a machine that is capable of controlling primary operational functions using an automated or semi-automated control system that does not require input from a human operator. For example, autonomous machine may include machines that are configured to operate without an operator being located in the operator console of the machine. Alternatively or additionally, autonomous machines may include machines having an on-board operator, but may be switched to autonomous mode to perform certain processes during the operation cycle (e.g., repetitious or routine functions or processes). For example, an autonomous machine may embody a machine having on-board or off-board electronic supervisory systems that are capable of directing and/or controlling operation and/or movement of the machine. According to one embodiment, an autonomous machine may include an on-board electronic control system that is configured to fully operate the machine in conjunction with one or more other electronic systems such as, for example, inertial navigation systems, collision avoidance systems, path planning and guidance systems, task assignment systems, and other types of systems for controlling operation of the machine. In such embodiments, the autonomous machine receives commands registered by the off-board equipment operator on a remote control console and operates the machine in accordance with the registered commands.

It is contemplated that some machines may be limited to operate exclusively in a manual mode, and cannot be operated in autonomous mode. Similarly, it is contemplated that some machines may be limited to operate exclusively in autonomous mode, and cannot be operated in a manual mode. It is also contemplated that some machines may be operated in both a manually-operated mode and an autonomous mode. Such machines may be configured to switch between manual and autonomous operation, depending upon a variety of different criteria.

According to one exemplary embodiment, a "dual-mode" machine (i.e., a machine that is configured to operate in both manual mode and autonomous mode) may be designated to primarily operate in the job-site in a manual mode, with a human operator. However, in certain situations, the machine may be switched to an autonomous mode of operate based on certain operational aspects of the machine. For example, if a manually-operated machine deviates from an authorized course of operation (i.e., path, speed, direction, etc.) by more than a threshold acceptable level, the machine may be switched to an autonomous mode of operation (in which one or more supervisory systems of the machine is configured to operate the machine according to the authorized course of operation) until the machine is restored to its authorized course of operation.

According to another exemplary embodiment, some "dual-mode" machines may be designated to operate primarily in an autonomous mode. However, in certain situations, the machine may be switched (e.g., with a manual pass code) to operate in a manual mode. For example, during service or maintenance of the machine, it may be practical for the technician to operate the machine manually. Alternatively, autonomous machines may be configured to automatically shut-down or become disabled in the event of an abnormal operating condition. In such situations, a service technician or manual operator may be authorized to override the shut-down, remove the machine from the job-site, and diagnose the abnormal condition. After repair, the machine may be re-integrated into the job-site in a manual mode (e.g., with a human operator) or in an autonomous mode. In some situations, the re-integrated machine may be placed in a "probationary" operational state for some predetermined time period, whereby the machine is allowed to operate in a limited capacity (e.g., with speed limits, payload limits, geographical limits, pitch/roll limits, time-of-operation limits, etc.) After the probationary period, the machine may be fully re-integrated into the job-site, in either autonomous mode or manual mode.

It is contemplated that, although certain "dual mode" machines are described as being operated primarily in either manual mode or autonomous mode (except in "certain situations") such a description is exemplary only. Indeed, in many situations, selection between manual mode and autonomous mode may be dictated by many factors including, for example: the needs of the job-site, the nature and schedule of the tasks to be performed at the job-site, the suitability of the job-site environment for human operators, and/or the staffing limitations and requirements for the job-site.

Figure 2:
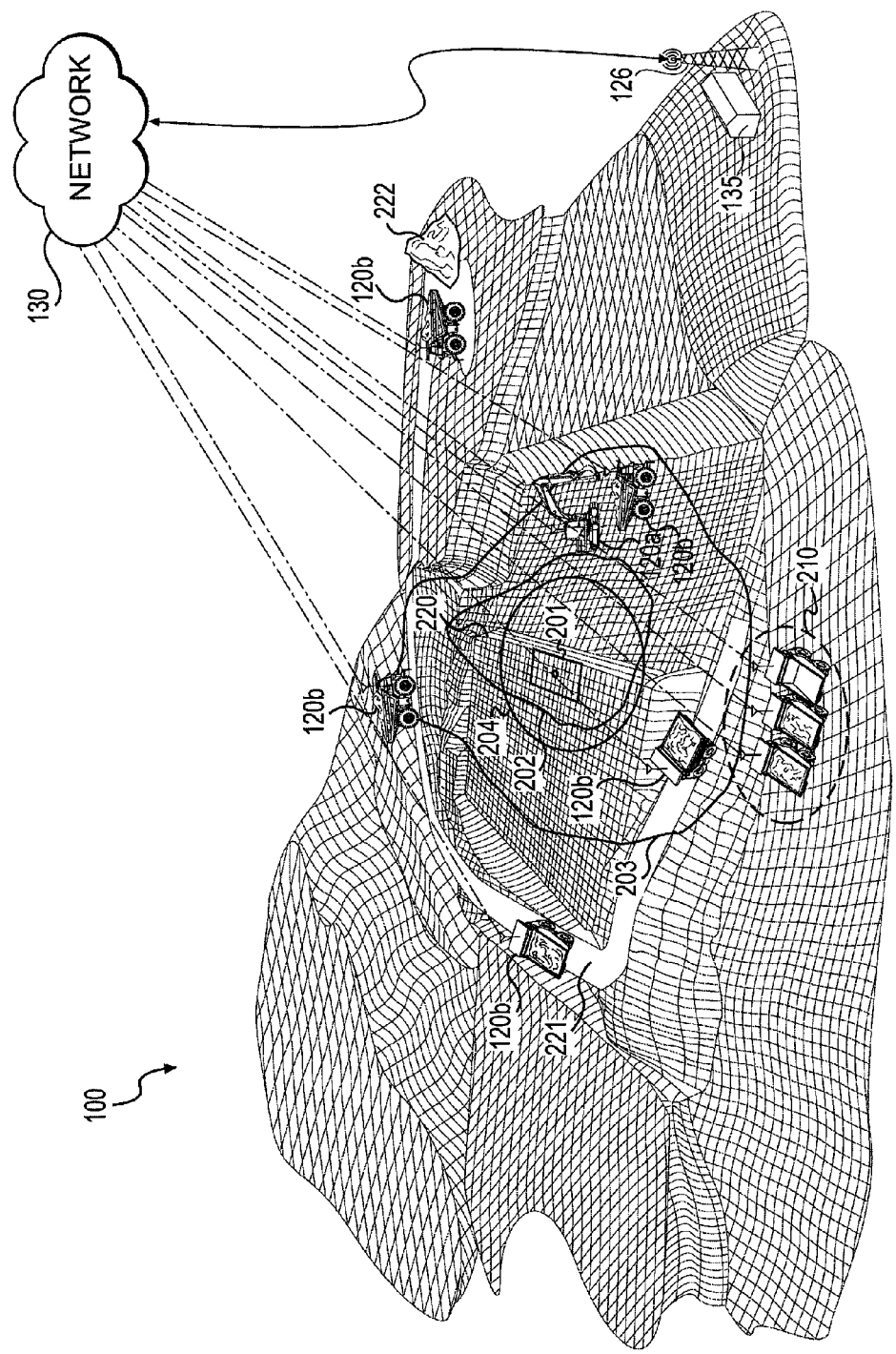
FIG. 2 provides a perspective illustration of an exemplary job-site that is configured to manage contingencies associated with the occurrence of a prospective event, in accordance with certain disclosed embodiments.

As illustrated in the exemplary embodiment shown in FIG. 1, job-site 100 may employ several large machines and other heavy equipment that cooperate to perform an industrial task. As is the case with many industrial tasks that rely on the cooperation of machine resources to complete a task, job-site 100 employs a job-site management system 135 for controlling a machine that is located in a designated area of a job-site by monitoring job-site operations, scheduling certain required events at appropriate times, and adjusting certain job-site operations to mitigate the effects of unplanned contingencies. FIG. 2 provides a perspective view of an exemplary job-site that is configured to manage contingencies associated with the occurrence of a prospective event.

FIG. 2 illustrates an exemplary job-site, at least a portion of which includes a surface mine pit for excavating ore (and/or other raw materials) from the surface of the job-site. As illustrated in FIG. 2, the mine pit may employ a plurality of machines 120a, 120b (and other heavy equipment) for removing and loading excavated material at a loading area located at the face 220 of the mine and hauling the excavated material from the loading area to a dump location 222 via haul road 221.

As explained in connection with FIG. 1, job-site 100 may include some machines that are configured to operate in a manual mode and other machines that are configured to operate in an autonomous mode. As illustrated in FIG. 2, for example, job-site 100 may include a first group of machines 210 that are each configured to operate in a manual mode. Job-site 100 may also include a second group of machines (depicted as machines 120a, 120b that are not included within first group of machines 210) that are each configured to operate in an autonomous mode.

Each of machines 120a, 120b may be communicatively coupled to a centralized communication network 130 and may be configured to provide operational and performance information collected by systems located on-board the machine to off-board systems, such as job-site management system 135. Furthermore, each of machines 120a, 120b may be configured to receive information associated with job-site operations from off-board systems via communication network 130. Such information may include operational control commands, software updates, weather reports, contingency plans, traffic updates, road closures, schedule changes, updated job-site maps, and any other information associated with job-site operations.

Periodically, certain events occur in and around job-site 100 that have the potential to significantly impact job-site operations and, in turn, may significantly impact the productivity and efficiency of job-site 100. Such events may be scheduled or unscheduled. Scheduled events may include road closures for maintenance, machine service and maintenance outages, outages for upgrades to communication network 130, or any other type of event that is scheduled in advance of the event by a particular time period (typically at least one 8-hour shift in advance). Unscheduled events may include road closures for unexpected obstructions in the road, shut-downs for certain hazardous events (e.g., fires, chemical spills, traffic accidents, etc.), or certain events critical to overall productivity of the job-site that require machine or resource reallocation from one task to another. Unscheduled events may also include changes or updates to previously-scheduled events, which are caused by real-time operations of job-site 100.

For example, many surface mine environments, such as the exemplary mine environment illustrated in FIG. 2, rely on the periodic detonation of explosive material beneath the mine surface to loosen surface material for removal and processing, a technique commonly referred to as "blasting." A blast event may involve the periodic placing and detonation of explosive material in an area 201 defined in and around a face 220 of mine. To mitigate the risk for damage to equipment, personnel, and job-site resources, job-site management system 135 may be configured to establish one or more zones 202-204, whereby operations of one or more machines 120a, 120b or groups of machines 210 may be controlled when located at or near the boundary of a respective zone. Furthermore, although prospective blasting events may, in some cases, be scheduled well in advance of when such blasting event is to occur, job-site management system 135 may be configured to establish and/or modify the schedule of blasting events (based on real-time operations of the mine) to limit the interruption of job-site operations caused by the blasting event.

Figure 3:
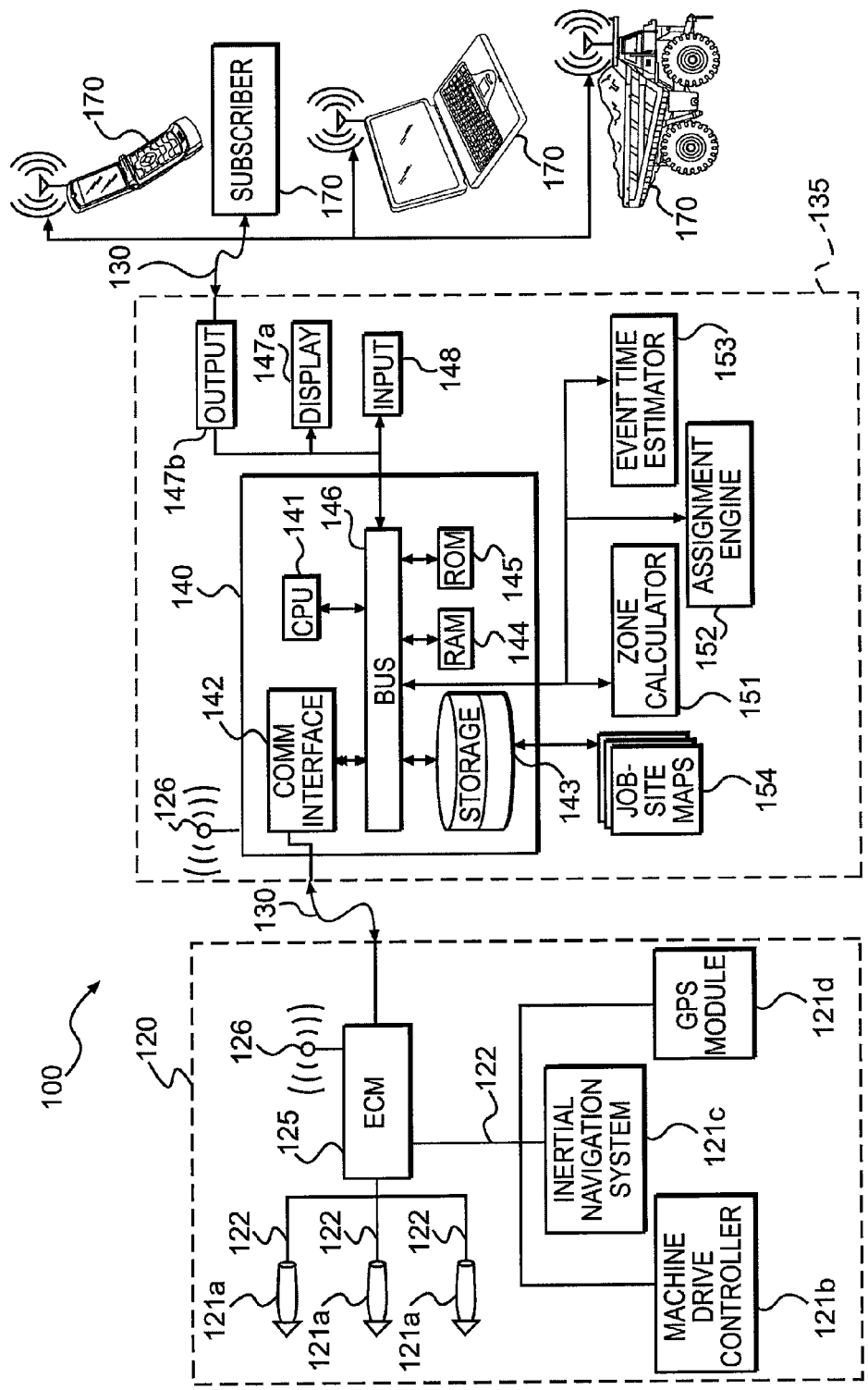
FIG. 3 provides a schematic diagram illustrating certain components associated with the job-sites illustrated in FIGS. 1 and 2.

FIG. 3 provides a schematic diagram illustrating certain components associated with the exemplary job-site 100 illustrated in FIGS. 1 and 2. Specifically, FIG. 3 provides a schematic illustrating components associated with machine 120, communication network 130, and job-site management system 135, which cooperate to execute processes and methods for controlling a machine that is located in a designated area.

According to an exemplary embodiment, each of machines 120a-120c may include on-board data collection and communication equipment to monitor, collect, and/or distribute information associated with one or more components of machines 120a-120c. As shown in FIG. 3, each of machines 120a-120c (denoted simply as machine "120") may each include one or more monitoring devices 121a. Monitoring devices 121a may include, for example, sensors 121a that collect operational information associated with a respective machine 120. Machines 120 may also include one or more subsystems for positioning and controlling machines 120, such as, for example, a machine drive system controller 121b, an inertial navigation system 121c, and a GPS module 121d. Monitoring devices 121a and subsystems 121b-121d may be coupled to one or more electronic control modules (ECMs) 125 via communication lines 122.

Machines 120 may also include one or more transceiver devices 126 for transmitting and receiving information between ECM 125 and one or more off-board systems. As such, machines 120 may receive information, warning signals, operator instructions, or other messages or commands from off-board systems, such as a job-site management system 135. The components and features of machines 120 described above are exemplary and not intended to be limiting. Accordingly, the disclosed embodiments contemplate one or more of machines 120 including additional and/or different components than those listed above.

Monitoring devices 121a may include any device suitable for receiving information indicative of an operational aspect of a machine or its associated components or subsystems. For example, monitoring devices 121a may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; grade; traction data; drive axle torque; intervals between scheduled or performed maintenance and/or repair operations; and any other operational parameter of machines 120. It is also contemplated that one or more of monitoring devices 121a may be configured to monitor certain physical or environmental features associated with job-site 100. For example, one or more machines 120 may include an inclinometer (not shown) for measuring an actual grade associated with a surface upon which a respective machine is traveling.

Machine drive system controller 121b may be communicatively coupled to a machine drive system (not shown) that is configured to maneuver, position, and propel machine 120 throughout job-site 100. Machine drive system controller 121b may be communicatively coupled to ECM 125 and configured to receive commands for moving, re-positioning, or maneuvering machine 120 from ECM 125. Machine drive system controller 121b may be configured to provide command signals to one or more components of the machine drive system in response to the commands received from ECM 125.

For example, machine drive system controller 121b may be communicatively coupled to one or more systems associated with machines 120. For example, machine drive system controller 121b may be communicatively coupled to a steering system, a braking system, and/or a hydraulic or electric drive system associated with machine(s) 120. For machines operating in manual mode, machine drive system controller 121b may be configured to receive direction and throttle commands from ECM 125 corresponding to a joystick/throttle command provided by an operator located in an operator console of machine 120. For machines operating in autonomous mode, machine drive system controller 121b may be configured to receive direction and throttle commands from ECM 125 corresponding to obstacle detection and path planning information received from an inertial navigation system and/or commands received from a remote control console associated with machine 120.

Inertial navigation system 121c may include a plurality of components and subsystems associated with controlling navigation and guidance of machine 120. For example, inertial navigation system 121c may include an obstacle detection and avoidance subsystem (not shown) for detecting objects in and around machine 120, determining information indicative of the detected objects (e.g., location, size, velocity (and/or acceleration), orientation, etc.), calculating risk of collision associated with the detected objects, determining a course of action to mitigate and/or prevent the risk of collision with the detected objects, and provide commands for adjusting the operation of machine 120 to execute the determined course of action. Inertial navigation system 121c may be included with machines that are configured to operate in a manual mode and in an autonomous mode. For machines operating in a manual mode, inertial navigation system 121c may be configured as a redundant control system to the main operator console (not shown) and may be required to operate when a manually-operated machine deviates from a course of behavior that is inconsistent with certain predetermined behavior established by a job-site manager or mine operator.

It is contemplated that, although inertial navigation system 121c is described as including obstacle detection and avoidance subsystems, obstacle detection and avoidance subsystems may be included as separate systems that operate in conjunction with or independent of inertial navigation system 121c. In such embodiments, inertial navigation system 121c may be configured as a system for determining machine navigation parameters based on real-time monitored operating parameters from the machine.

GPS module 121d may be communicatively coupled to ECM 125 and may be configured to determine the position of machine 120 within job-site 100. For example, GPS module 121d may be configured to receive timing and position signals that are broadcast from one or more satellites orbiting Earth and/or one or more terrestrial stations located on Earth. Based on the timing and position signals, GPS module 121d may be configured to determine a latitude, longitude, and altitude of the GPS module 121d (and, thus, machine 120). GPS module may provide this information to ECM 125, which may, in turn, be provided (either periodically or continuously) to job-site management system 135.

Although certain exemplary embodiments are illustrated and described using a "GPS module," it is contemplated that any suitable global navigation satellite system ("GNSS") may be used, and that the description of certain embodiments as including a "GPS" system or feature be considered to include any suitable GNSS system or feature. For example, is it contemplated that at least one of a NAVSTAR system, a GLOSNASS system, a Galileo system, or any other suitable GNSS system can be used in combination with and/or as an alternative to GPS module 121d.

ECM 125 may be configured to receive, collect, package, and/or distribute data collected by monitoring devices 121a, machine drive system controller 121b, inertial navigation system 121c, and GPS module 121d. Data, as the term is used herein, refers to any type of data indicative of at least one operational aspect associated with one or more machines 120 or any of its constituent components or subsystems. Non-limiting examples of data may include, for example, machine status information such as fuel level, oil pressure, engine temperature, coolant flow rate, coolant temperature, tire pressure, or any other data indicative of the status of one or more components or subsystems of machines 120. Alternatively and/or additionally, data may include status information such as engine power status (e.g., engine running, idle, off), engine hours, engine speed, machine speed, machine location and speed, current gear that the machine is operating in, or any other data indicative of a status of machines 120. Optionally, data may also include certain productivity information such as task progress information, load vs. capacity ratio, shift duration, haul statistics (weight, payload, etc.), fuel efficiency, or any other data indicative of a productivity of machine 120. Alternatively and/or additionally, data may include control signals for controlling one or more aspects or components of machines 120. ECM 125 may receive data from one or more monitoring devices via communication lines 122 during operations of the machine. According to one embodiment, ECM 125 may automatically transmit the received data to job-site management system 135 via communication network 130. Alternatively or additionally, ECM 125 may store the received data in memory for a predetermined time period, for later transmission to job-site management system 135. For example, if a communication channel between the machine and job-site management system 135 becomes temporarily unavailable, the data may be retrieved for subsequent transmission when the communication channel has been restored.

Communication network 130 may include any network that provides two-way communication between machines 120 and an off-board system, such as job-site management system 135. For example, communication network 130 may communicatively couple machines 120 to job-site management system 135 across a wireless networking platform such as, for example, a satellite communication system. Alternatively and/or additionally, communication network 130 may include one or more broadband communication platforms appropriate for communicatively coupling one or more machines 120 to job-site management system 135 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a satellite wireless communication network, it is contemplated that communication network 130 may include wireline networks such as, for example, Ethernet, fiber optic, waveguide, or any other type of wired communication network.

Job-site management system 135 may include one or more hardware components and/or software applications that cooperate to manage performance of a job-site by monitoring, analyzing, optimizing, and/or controlling performance or operation of one or more individual machines. Job-site management system 135 may include a computer system 140 for collecting, distributing, analyzing, and/or otherwise managing data collected from machines 120. Job-site management system 135 may also include a zone calculator 151, an machine assignment engine 152, an event time estimator 153, and a job-site map database 154, each of which are communicatively coupled to computer system 140.

Computer system 140 may include any computing system configured to receive, analyze, transmit, and/or distribute data associated with machines 120. Computer system 140 may be communicatively coupled to one or more machines 120 via communication network 130. Computer system 140 may embody a centralized server and/or database adapted to collect and disseminate data associated with each of machines 120. Once collected, computer system 140 may categorize and/or filter the data according to data type, priority, etc. In the case of critical or high-priority data, computer system 140 may be configured to transmit "emergency" or "critical" messages to one or more work site personnel (e.g., repair technician, project managers, etc.) indicating that a remote asset has experienced a critical event. For example, should a machine become disabled, enter an unauthorized work area, or experience a critical engine operation condition, computer system 140 may transmit a message (text message, email, page, etc.) to a project manager, job-site foreman, shift manager, machine operator, and/or repair technician, indicating a potential problem with the machine.

Computer system 140 may include hardware and/or software components that perform processes consistent with certain disclosed embodiments. For example, as illustrated in FIG. 3, computer system 140 may include one or more transceiver devices 126, a processor or central processing unit (CPU) 141, a communication interface 142, one or more computer-readable memory devices, including storage device 143, a random access memory (RAM) module 144, and a read-only memory (ROM) module 145, a display unit 147a, and output device 147b, and/or an input device 148. The components described above are exemplary and not intended to be limiting. Furthermore, it is contemplated that computer system 140 may include alternative and/or additional components than those listed above.

CPU 141 may be one or more processors that execute instructions and process data to perform one or more processes consistent with certain disclosed embodiments. For instance, CPU 141 may execute software that enables computer system 140 to request and/or receive data from ECM 125 of machines 120. CPU 141 may also execute software that stores collected data in storage device 143. In addition, CPU 141 may execute software that enables computer system 140 to analyze data collected from one or more machines 120, modify one or more production aspects of the machine (e.g., production schedule, product release date, production budget, etc.), improve a component parameter based on one or more predefined specifications associated with the component, and/or provide customized operation analysis reports, including recommendations for component optimization and/or design.

CPU 141 may be connected to a common information bus 146 that may be configured to provide a communication medium between one or more components associated with computer system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for two-way data communication between computer system 140 and remote systems (e.g., machines 120) via transceiver device 126. For example, communication interface 142 may include one or more modulators, demodulators, multiplexers, demultiplexers, network communication devices, wireless devices, antennas, modems, or any other devices configured to support a two-way communication interface between computer system 140 and remote systems or components.

One or more computer-readable medium devices may include storage devices 143, a RAM 144, ROM 145, and/or any other magnetic, electronic, flash, or optical data computer-readable medium devices configured to store information, instructions, and/or program code used by CPU 141 of computer system 140. Storage devices 143 may include magnetic hard-drives, optical disc drives, floppy drives, flash drives, or any other such information storing device. A random access memory (RAM) device 144 may include any dynamic storage device for storing information and instructions by CPU 141. RAM 144 also may be used for storing temporary variables or other intermediate information during execution of instructions to be executed by CPU 141. During operation, some or all portions of an operating system (not shown) may be loaded into RAM 144. In addition, a read only memory (ROM) device 145 may include any static storage device for storing information and instructions by CPU 141.

Display 147a may include any suitable interface for conveying information associated with job-site management system 135 to one or more user of computer system 140. Display 147a may include graphical user interface (GUI) software and a display monitor (e.g., CRT, LCD, LED, plasma, etc.).

Output devices 147b may include any device suitable for outputting, transmitting, and/or distributing information associated with job-site management system 135 to one or more subscribers 170. According to one embodiment, output devices 147b may include network distribution devices for distributing information to a mobile network device (e.g., cell phone, pager, laptop, PDA, etc.) subscriber 170 associated with job-site personnel. Alternatively or additionally, output devices 147b, may include a printer, plotter, or other type of device for creating and/or formatting a paper-based report summarizing information associated with job-site management system 135.

Input devices 148 may include any device suitable for receiving input from one or more subscribers 170 or users of computer system 140. Input devices 148 may include, for example, a mouse, keyboard console, an interactive display associated with a touch-screen device, voice recognition hardware and associated software, a joystick, or any other type of device that may be used to provide data to computer system 140.

Computer system 140 may be configured to analyze data associated with each of machines 120. According to one embodiment, computer system 140 may include diagnostic software for analyzing data associated with one or more machines 120 based on threshold levels (which may be factory set, manufacturer recommended, and/or user configured) associated with a respective machine. For example, diagnostic software associated with computer system 140 may compare an engine temperature measurement received from a particular machine with a predetermined threshold engine temperature. If the measured engine temperature exceeds the threshold temperature, computer system 140 may generate an alarm and notify one or more of the machine operator, job-site manager, repair technician, dispatcher, or any other appropriate entity.

In accordance with another embodiment, computer system 140 may be configured to monitor and analyze productivity associated with one or more of machines 120. For example, computer system 140 may include productivity software for analyzing data associated with one or more machines 120 based on user-defined productivity thresholds associated with a respective machine. Productivity software may be configured to monitor the productivity level associated with each of machines 120 and generate a productivity report for a project manager, a machine operator, a repair technician, or any other entity that may subscribe to operator or machine productivity data (e.g., a human resources department, an operator training and certification division, etc.) According to one exemplary embodiment, productivity software may compare a productivity level associated with a machine (e.g., amount of material moved by a particular machine) with a predetermined productivity quota established for the respective machine. If the productivity level is less than the predetermined quota, a productivity notification may be generated and provided to the machine operator and/or project manager, indicating the productivity drop of the machine.

Computer system 140 may be in data communication with one or more other back-end systems and may be configured to distribute certain data to these systems for further analysis. For example, computer system 140 may be communicatively coupled to a zone calculator 151, an assignment engine 152, an event time estimator 153, and/or a database 154 containing one or more job-site maps. Computer system 140, in cooperation with zone calculator 151, assignment engine 152, event time estimator 153, and job-site map database 154, may provide a system for controlling a machine that is located in a designated area of a job-site by monitoring job-site operations, scheduling certain required events at appropriate times, and adjusting certain job-site operations to mitigate the effects of unplanned contingencies.

Zone calculator 151 may include a module for calculating the size, shape, and boundary location of one or more zones associated with the occurrence of a prospective event. For example, zone calculator 151 may receive information indicative of the size, nature, and/or location of the prospective event. In response, zone calculator 151 may calculate one or more zones in which the risk of potential impact from the prospective event exceeds a threshold level. According to the embodiment illustrated in FIG. 2, zone calculator 151 may determine a single zone 204 as a predetermined radius around the center of area 201 in which the prospective event is to occur. According to another embodiment, zone calculator 151 may be configured to define zones based on certain criteria, such as the topography of job-site 100, which may result in zone areas (such as those associated with zone 202, 203) that more accurately reflect the area of potential impact caused by the event.

Assignment engine 152 may include a module for assigning and scheduling tasks associated with individual machines and groups of machines. According to one embodiment, assignment engine 152 may be configured to assign tasks based on the time and location of the prospective event, as well as the size and location of the zone(s) established by zone calculator 151. For example, if one or more machines is to be prevented from operating in a region of the mine site due to the occurrence of an event, it may be re-assigned to operate in a region that is not affected by the occurrence of the event.

Alternatively or additionally, assignment engine 152 may also be configured to generate commands that, when received by ECM 125 of one or more machines 120, cause the machine to embark on a particular course of action immediately. As such, assignment engine 152 may be allowed to override performance of tasks associated with individual machines or groups of machines should, for example, assignment engine 152 receive a signal indicating that performance of the event is imminent. As such, assignment engine 152 may be configured to prioritize certain job-site operations in order to more efficiently manage job-site 100.

Event time estimator 153 may include a module for establishing and/or modifying a time that a prospective event is to commence/occur based on real-time (or near-real-time) operations of job-site 100. According to one embodiment, event time estimator 153 may be used in cooperation with assignment engine 152 and/or position information associated with machines 120 to predict an appropriate/ideal time for starting the event (or an appropriate/ideal time period for executing the event) based on machine assignments stored in assignment engine 152. For example, event time estimator 153 may estimate a time in which a number of machines operating in a particular zone is less than a threshold value, based on current and expected positions of machines 120 and/or current or future assignments of machines 120 stored in assignment engine 152.

Job-site map database 154 may be coupled to storage device 143 and include electronic maps associated with job-site 100. As such, job-site map database 154 includes information indicative of job-site features that may be used by job-site management system 135 in managing job-site 100. For example, job-site map database 154 may include topographical information, haul road path location information, road closure information, and other such information associated with job-site 100. According to one embodiment, topographical information may be used by zone calculator 151 to establish boundaries associated with zone(s) of potential impact. Alternatively or additionally, topographical information, haul road path location information, and road closure information may be used to estimate a future position of the machine by predicting an expected speed with which the machine can traverse the job-site. It is contemplated that job-site map database may be updated periodically (e.g., daily, hourly, at shift change time(s), etc.) to reflect certain changes to the job-site environment.

Job-site management system 135 may be configured to manage job-site operations by controlling a machine that is located in one or more of the zones established by zone calculator 151 and output control information to one or more subscribers 170 associated with job-site 100. Subscribers 170 may include, for example, mobile communication devices (e.g., pagers, cell phones, PDAs, laptops, etc.) associated with job-site personnel, operators (not shown) of one or more machines 120, and ECMs 125 associated with one or more machines 120.

Figure 4:
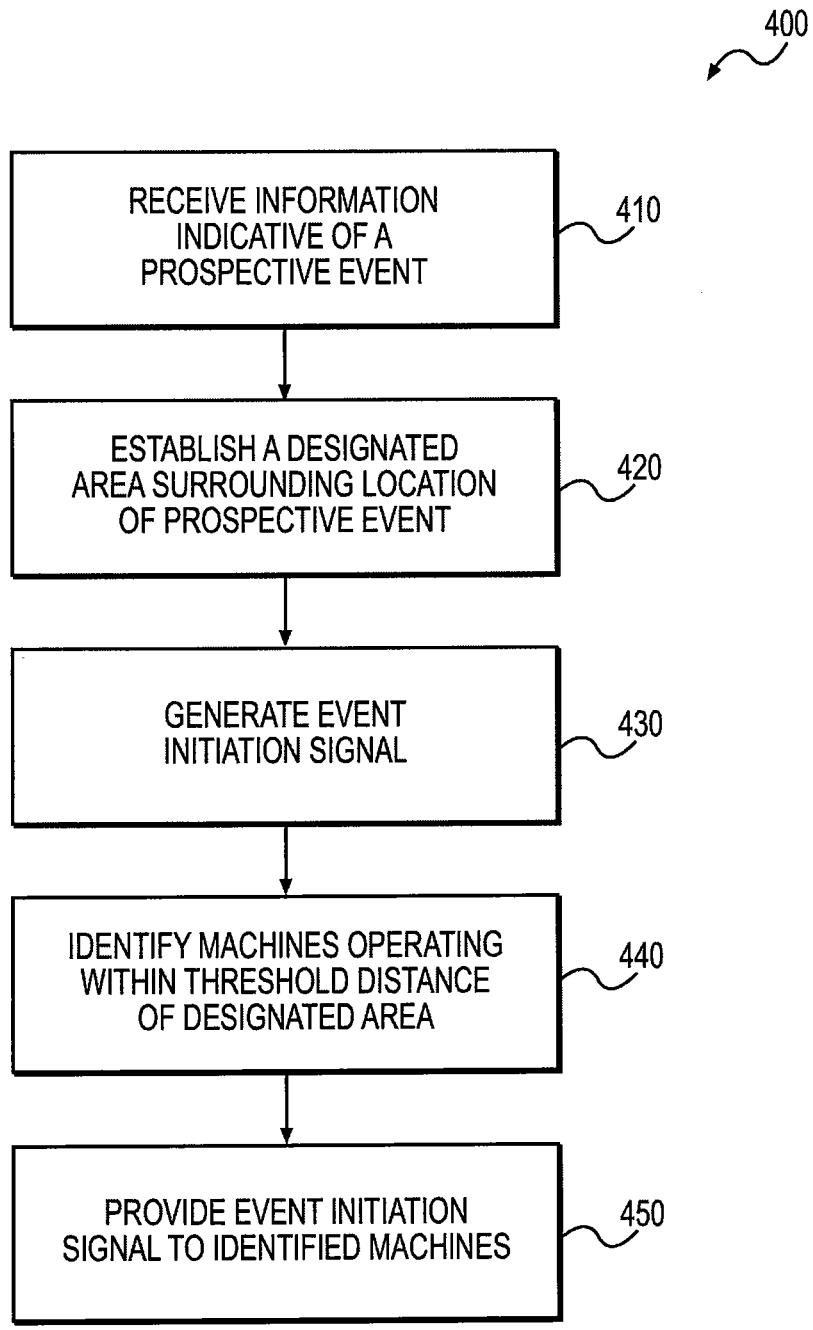
FIG. 4 provides a flowchart depicting an exemplary method for controlling a machine that is located in a designated area of a job-site, consistent with certain disclosed embodiments.
Figure 5:
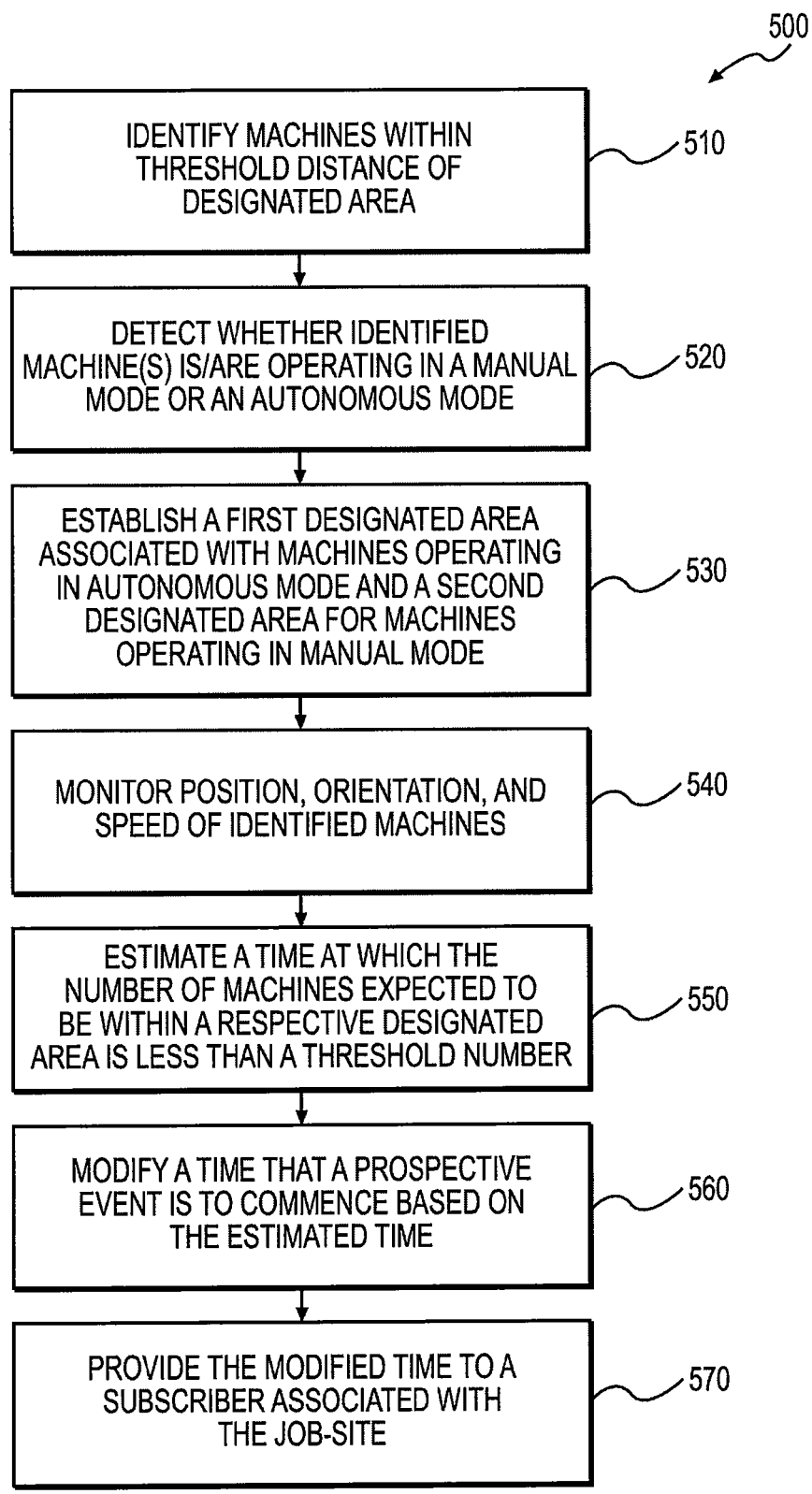
FIG. 5 provides a flowchart depicting an exemplary method for managing certain aspects of the job-site associated with the occurrence of a prospective event.

Processes and methods consistent with the disclosed embodiments may enable control of one or more machines 120 operating in a designated area of a job-site based on information indicative of the occurrence of a prospective event that potentially has significant impact on job-site operations. Specifically, the features and methods described herein enable a job-site management system 135 that establishes one or more designated zones, each of which define a level of acceptable machine behavior during the occurrence of the prospective event and controls individual machines or groups of machines based on their proximity relative to the designated zones. Optionally, processes and methods consistent with the disclosed embodiments may facilitate establishing and/or modifying times associated with the occurrence of a prospective event based on a predicted impact of the prospective event on operations of the job-site. FIGS. 4 and 5 provide flowcharts 400 and 500, respectively, which illustrate exemplary methods for managing job-site operations based on the occurrence of a prospective event.

As illustrated in flowchart 400 of FIG. 4, processor 141 associated with job-site management system may receive information indicative of a prospective event (Step 410). Information indicative of the occurrence of a prospective event may include, for example, an expected time, location, and duration of the event; the nature of the event (e.g., road closure, machine outage, haul road obstruction, hazardous event, etc.); the radius of expected impact of the event; and any other information that may be useful in predicting the impact that the prospective event may have on job-site 100. According to one embodiment, processor 141 may be configured to receive, from one or more machines 120 (e.g., such as drill rig 120*c*, excavator 120*a*, haul truck 120*b*) or subscribers 170, a signal indicative of the existence of a prospective event.

For example, an operator of drill rig 121*c* that is involved in the preparation of a detonation area 201 of mine face 220 may receive information indicative of a prospective detonation of the explosive material from, for example, an explosives team that is responsible for the placement and detonation of explosive material at the mine site. Information indicative of the prospective detonation may include, for example, a location associated with the placement of explosive material (e.g., a blast "grid"), an amount of explosive material that is rigged for detonation, the type and density of surface material in which the explosive material is placed, a depth at which the explosive material is placed, an expected blast radius associated with the prospective detonation, an estimated time that the expected blast is to commence, an expected duration of the blast, and any other information that may be used by job-site management system 135 in predicting the impact of the blast. The operator of drill rig 121*c* may relay the request to processor 141 of job-site management system 135 via communication network 130.

Upon receipt of information indicative of occurrence of a prospective event, processor 141 may establish a designated area surrounding the location of the prospective event (Step 420). Following the blast zone example above, processor 141 may determine a blast radius associated with a prospective detonation event. The blast radius may be determined based on the received information indicative of the prospective detonation, such as the location and depth at which the explosive materials is placed, the amount of explosive material that is used, and the type and density of surface material in which the explosive material is placed. According to one embodiment, processor 141 may determine the blast radius using a look-up table that lists blast radius as a function of soil conditions, amount of explosive material used, and the depth at which the explosive material is placed. According to another embodiment, processor 141 may determine the blast radius using one or more known mathematical equations for calculating blast radius and blast intensity. Alternatively and/or additionally, processor 141 may be configured to execute one or more algorithms for performing mathematical functions for determining blast radius and/or defining the blast zone (e.g., by executing one or more finite-element analysis software programs).

Once a blast radius has been determined, processor 141 may be configured to establish one or more designated areas surrounding the prospective event (Step 430). For example, processor 141 may establish one or more zones surrounding the location of the blast event, by modifying the blast radius to account for certain features associated with the job site, which may be determined by accessing and analyzing job site maps accessible through job site map database 154. For example, if the detonation material is placed along the face 220 of a surface mine (as in FIG. 2), the blast energy that is directed outward from the face of the mine will tend to emanate farther than blast energy directed inward toward the mine, because blast energy directed outward (where there is no adjacent surrounding material) will not be attenuated as much as blast energy directed inward toward the mine (where there is an abundance of surrounding material to absorb the energy). As such, processor 141 may modify the boundaries of the blast radius to reflect the potential impact that blast energy will have on the surrounding area.

Although certain embodiments are disclosed and/or illustrated as being associated with the establishment of a single, monolithic zone, it is contemplated that one or more of the blast zone and/or designated areas may encompass a plurality of discrete, non-contiguous areas. For example, if a portion of the blast zone and/or designated areas includes a part of a haul road, processor 141 may be configured to establish additional areas at the adjacent intersection(s) associated with the designated area that includes a part of the haul road. In this way, processor 141 may be configured to ensure that, if all or part of the blast zone or designated area contains an area, the access to which may be more appropriately controlled or contained by excluding access to one or more other areas, processor 141 may be adapted to designate separate, additional, and/or non-continuous areas as being associated with the designated area. Processor 141 may obtain intersection information from job-site map database 154.

According to an alternate embodiment, this feature of establishing non-contiguous areas as part of one or more designated areas may be useful for expanding the zone to include portions of the job-site that may be particularly vulnerable to vibration. For example, if part of the blast zone or designated area is within a threshold distance of an area that has been identified as particularly vulnerable to vibration, even if such area is located in a non-contiguous position from the blast zone or designated area, processor 141 may be adapted to establish such an area as part of the zone to control machine behavior in these areas during the prospective event.

According to one embodiment, because different machines and equipment resources may have different capabilities to operate in or around the location of particular prospective events, processor 141 may establish multiple zones surrounding the location of the prospective event. Each machine may be configured to behave differently when operating within the boundaries of different zones. For example, one or more machines may be allowed to operate closer to a particular event than certain machines. Alternatively or additionally, some machines may be prevented from operating within any of the designated zones, due to the risk of damage to the machine and/or personnel operating the machine. According to yet another alternative, certain capabilities associated with one or more machines may be disabled when operating within one of the zones, while the machine may remain fully operational when operating within the other zone(s). According to another alternative, machines operating within a threshold distance of a boundary associated with one or more zone may be disabled if they attempt to enter the zone designated by the boundary.

According to one embodiment and as shown in FIG. 2, processor 141 may establish first and second zones 202 and 203, respectively, around location 201 of the prospective blast zone. According to one embodiment, each of machines 120a, 120b and/or groups of machines 210 may be configured to tailor their operation based on the location of the machine relative to the zones. For example, machine group 210 may each be configured as manually operated machines, which may be programmed, when located within first and second zones 202 and 203 during the occurrence of a blast event, to disable manual operations and/or to only allow manual operation consistent with removing the machine from first and second zones 202 and 203. According to one embodiment, manually-operated machines 210 may be prohibited from manual operation within zones 202 and 203 and may be switched to autonomous mode where each machine is automatically relocated to a designated area outside of zones 202 and 203. According to one embodiment, path planning subsystems associated with each of machines 210 may be configured to determine the shortest and/or fastest route for exiting zones 202 and 203.

According to another embodiment, machines 120a, 120b that are not associated with group 210 may be configured to operate in autonomous mode, and may be programmed, when located within zone 202 during the occurrence of a blast event at location 201, to remain operational within outer zone 203 and become inoperable and/or to only allow manual operation consistent with removing the machine from second zones 203. As an alternative or in addition to becoming inoperable within zone 202, path planning subsystems associated with each of machines 120a, 120b may be configured to determine the shortest and/or fastest route for exiting zone 202 and cause the machines to exit zone 202 accordingly.

Once designated zones associated with the prospective event have been established, processor 141 may generate an event initiation signal (Step 430). The event initiation signal may include any suitable signal for notifying machines 120a-120c and subscribers 170 that a prospective event is to occur. Event initiation signal may include information indicative of a location of a boundary associated with the designated area, and information indicative of a time that the prospective event is to commence.

Once the event initiation signal has been generated, processor 121 may be configured to detect one or more machines 120a-120c and groups of machines 210 operating within a threshold distance of the designated area (Step 440). Following the mine site example above, processor 141 may monitor the position of each of machines 120a-120c and identify machines that are within a predetermined range of the location of the blast event.

Processor 121 may provide the event notification to the identified machines (Step 450). Event notification signal may be configured to initiate, at the time that the prospective event is to commence, an event control sequence for each of the one or more machines. The event control sequence nay be configured to control movement of the one or more machines based on a location of the machine relative to the location of the boundary associated with one or more of zones 202-204 and 203, as described above.

The methods and systems described herein are directed to managing operations of job-site 100 by controlling operations of machines based on certain characteristics associated with the occurrence of a prospective event. It is also contemplated that processes and methods consistent with the disclosed embodiments allow a job-site management system 135 to manage operations of the job-site by modifying the certain characteristics of the prospective event based on operations of machines operating in job-site 100. FIG. 5 provides a flowchart 500 that illustrates and exemplary method for establishing and/or modifying a time associated with the prospective event based on operations of machines 120 within job-site 100.

As illustrated in FIG. 5, processor 141 of job-site management system 135 may identify machines within a threshold distance of a designated area associated with a job-site (Step 510). As described in the method illustrated in flowchart 400, once machines have been identified, processor 141 may be configured to detect whether the identified machines are operating in a manual mode or an autonomous mode (Step 520) and establish first and second designated areas, which define boundaries for controlling the behavior of machines operating in autonomous and manual modes (Step 530).

Processor 141 may monitor a position, orientation, and speed of each of the identified machines (Step 540). For example, processor 141 may analyze GPS and inertial system data associated with individual machines to determine the location of each machine within job-site 100 and the direction and speed with which each machine is travelling.

Based on the position, orientation, and speed information, processor 141 may estimate a time in which the number of machines within a respective designated area will be less than a threshold number of machines (Step 550). For example, processor 141 may predict a time in which each machine will be located outside each of designated zones 202-204, based on its current course of travel and/or task assignment information associated with each machine. Processor 141 may estimate a time in which the number of machines remaining in the zones is less than a threshold number of machines. The threshold number of machines may be established (e.g., by a subscriber 170) as a number at which the predicted productivity loss for relocating machines remaining in the zone to outside of a corresponding zone is acceptable in light of further delay of the occurrence of the prospective event. Processor 141 may establish/modify the time that the prospective event is to commence as the estimated time in which the number of machines within one or more of the designate areas is less than a threshold number (Step 560) and provide the modified time to subscribers 170 (including ECMs 125 of machines 120a-120c) associated with job-site 100 (Step 570). According to one embodiment, processor 141 may provide the modified time as an event initiation signal configured to initiate, at the time that the prospective event is to commence, an event control sequence for each of the one or more machines. As explained, the event control sequence is configured to control movement of the one or more machines based on a location of the machine relative to the location of the boundary during the occurrence of the prospective event.

INDUSTRIAL APPLICABILITY

Systems and methods consistent with the disclosed embodiments provide a job-site management solution that enables job-site managers to identify occurrence of a prospective event, determine the magnitude and nature of the event, establish different zones of operation, and control the behavior of job-site equipment during the occurrence of the event. The systems and methods described herein may be particularly advantageous when employed in mine environments, where management of unscheduled, periodic blast events—and job-site operations associated therewith—can significantly affect the productivity and efficiency of the job-site.

Although certain exemplary embodiments disclosed herein are described in connection with blast events that occur in surface mine environments, they may be applicable to any work environment where it may be advantageous to monitor the occurrence of a prospective event and control the behavior of equipment and resources in and around the location of the prospective event. Indeed, the presently disclosed systems and methods may be implemented in most any commercial or industrial work environment that relies on detecting unscheduled contingencies and adjusting work environment operations to accommodate such contingencies.

The presently disclosed systems and methods for controlling machine operations in designated areas that are established in connection with the occurrence of a prospective event may have several advantages. For example, the job-site management system is configured to establish zones associated with a prospective event in real-time and generate event initiation signals that automatically control the behavior of individual machines within the established zones. In contrast with conventional systems that merely provide warning signals to machine operators that disobey certain guidelines for machine behavior in hazardous zones, the presently disclosed system provides a solution for remotely and/or autonomously controlling the machine behavior if the machine is operating inconsistent with established zone criteria. As a result, the systems and methods described herein provide an automated approach to contingency planning and execution, which increases job-site efficiency when compared with conventional contingency planning methods.

It will be apparent to those skilled in the art that various modifications and variations can be made to the disclosed systems and methods for controlling machines located in designated areas without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for determining machine control zones, comprising:
    receiving information indicative of an occurrence of a prospective event; and
    providing, to one or more machines, an event initiation signal configured to cause a controller of the one or more machines to control movement of the one or more machines based at least on a location of the machine relative to a designated area surrounding a location at which the prospective event is to occur.

2. The method of claim 1, wherein the information indicative of the occurrence of the prospective event includes at least a time that the prospective event is to commence and the location at which the prospective event is to occur, the method further comprising determining a location of a boundary associated with the designated area based on the information indicative of the occurrence of the prospective event.

3. The method of claim 2, further comprising:
    monitoring a position of one or more of the machines;
    modifying the time that the prospective event is to commence based on the position of the one or more of machines; and
    providing, to the one or more machines, an updated event initiation signal that includes the modified time that the prospective event is to commence.

4. The method of claim 3, wherein modifying the time that the prospective event is to commence includes estimating, based on the position of the one or more machines, a time at which the number of machines expected to be within the designated area is less than a threshold number.

5. The method of claim 3, further including determining, for each of the one or more machines, whether the machine is operating in a manual mode or an autonomous mode.

6. The method of claim 5, wherein the designated area includes a first designated area, the method further comprising:
  establishing a second designated area surrounding the location at which the perspective event is to occur, the second designated area encompassing the first designated area,
  wherein the event initiation signal comprises information indicative of a location of a boundary associated with the second designated area, and
  wherein the event initiation signal is further configured to cause a controller of the one or more machines to control movement of each manually-operated machine, based at least on the location of the manually-operated machine and the location of the boundary associated with the second designated area.

7. The method of claim 6, wherein the event initiation signal is further configured to cause a controller of the one or more machines to prevent manual operation of the manually-operated machine within the second designated area.

8. The method of claim 7, wherein the event initiation signal is further configured to cause a controller of the one or more machines to enable automated control of a manually-operated machine that is located within the second designated area and cause the manually-operated machine to exit the second designated area along a predetermined path to the boundary of the second designated area.

9. The method of claim 6, wherein the event initiation signal is further configured to cause a controller of the one or more machines to prevent autonomous operation of the machine within the first designated area.

10. The method of claim 1, wherein the designated area includes a blast zone located in a mine site, the prospective event includes a detonation of explosive material in the blast zone, and information indicative of the prospective event includes an amount of explosive material rigged for detonation.

11. The method of claim 10, wherein determining the location of the boundary associated with the designated area includes:
  estimating a blast radius around the location at which the prospective event is to occur based at least on the amount of explosive material rigged for detonation;
  analyzing a topographical profile associated with the location at which the prospective event is to occur based on a job site map; and
  establishing a location of the of a boundary associated with the designated area based at least on the estimated blast radius and the topographical profile associated with the location at which the prospective event is to occur.

12. The method of claim 1, wherein the event initiation signal is further configured to cause a controller of the one or more machines to disable the one or more machines if the one or more machines attempt to enter the designated area.

13. A method for controlling a machine, comprising:
  receiving, at a processor associated with a job-site management system, information indicative of an occurrence of a prospective event;
  identifying, at the processor, a designated area surrounding a location at which the perspective event is to occur;
  identifying, at the processor, one or more machines operating within the designated area; and
  providing, by the processor to the one or more identified machines, an event initiation signal, wherein the event initiation signal is configured to initiate an event control sequence for each of the one or more identified machines, the event control sequence configured to control movement of the one or more identified machines based at least on a location of the machine relative to the designated area.

14. The method of claim 13, wherein providing the event initiation signal includes:
  generating, by the processor, the event initiation signal, which comprises:
    information indicative of a location of a boundary associated with the designated area; and
    information indicative of a time that the prospective event is to commence.

15. The method of claim 14, further comprising:
  monitoring, at the processor, a position of one or more of the identified machines;
  modifying, by the processor, the time that the prospective event is to commence based on the position of the one or more of the identified machines; and
  providing, by the processor to a subscriber associated with the job-site management system, the modified time that the prospective event is to commence.

16. The method of claim 15, wherein the designated area includes a first designated area and identifying one or more machines operating near the designated area includes detecting, for each of the one or more of the identified machines, whether the machine is operating in a manual mode or an autonomous mode, the method further comprising:
  establishing, at the processor, a second designated area surrounding the location at which the perspective event is to occur, the second designated area encompassing the first designated area,
  wherein the event initiation signal comprises information indicative of a location of a boundary associated with the second designated area, and
  wherein the event control sequence is further configured to control movement of each manually-operated machine, based at least on the location of the manually-operated machine and the location of the boundary associated with the second designated area.

17. A system for controlling a machine that is located near a blast zone in a mine environment, comprising:
  a communication interface for receiving information indicative of an occurrence of a detonation of explosive material in a mine site; and
  a processor coupled to the communication interface and configured to:
    identify a blast zone surrounding a location at which the detonation is to occur;
    identify one or more machines operating within the blast zone; and
    provide, to the one or more identified machines, an event initiation signal, wherein the event initiation signal is configured to initiate an event control sequence for each of the one or more machines, the event control sequence configured to control movement of the one or more machines based at least on a location of the machine relative to the blast zone.

18. The system of claim 17, wherein the processor is further configured to identify one or more machines operating near the blast zone by detecting, for one or more of the identified machines, whether the machine is operating in a manual mode or an autonomous mode.

19. The system of claim 18, wherein the blast zone includes a first blast zone, and wherein the processor is further configured to:
  establish a second blast zone surrounding the location at which the detonation is to occur, the second blast zone encompassing the first blast zone, wherein the event initiation signal comprises information indicative of a location of a boundary associated with the second blast zone, and wherein the event control sequence is further configured to control movement of each manually-operated machine, based at least on the location of the manually-operated machine and the location of the boundary associated with the second blast zone.

20. The system of claim 19, wherein the event control sequence prevents manual operation of the manually-operated machine within the second blast zone and prevents autonomous operation of the machine within the first blast zone.

21. The system of claim 19, wherein the event control sequence enables automated control of a manually-operated machine that is located within the second blast zone and causes the manually-operated machine to exit the second blast zone along a predetermined path to the boundary of the second blast zone.

* * * * *